(12) United States Patent  
Gouldey et al.

(10) Patent No.: US 12,197,335 B2  
(45) Date of Patent: Jan. 14, 2025

(54) CANCELING PREFETCH OF CACHE BLOCKS BASED ON AN ADDRESS AND A BIT FIELD

(71) Applicant: SiFive, Inc., San Mateo, CA (US)

(72) Inventors: Eric Andrew Gouldey, Fort Collins, CO (US); Wesley Waylon Terpstra, San Mateo, CA (US); Michael Klinglesmith, Chambéry (FR)

(73) Assignee: SiFive, Inc., San Mateo, CA (US)

( * ) Notice: Subject to any disclaimer, the term of this patent is extended or adjusted under 35 U.S.C. 154(b) by 0 days.

(21) Appl. No.: 18/182,772

(22) Filed: Mar. 13, 2023

(65) Prior Publication Data

US 2024/0184701 A1    Jun. 6, 2024

Related U.S. Application Data

(60) Provisional application No. 63/429,921, filed on Dec. 2, 2022, provisional application No. 63/429,922, filed on Dec. 2, 2022.

(51) Int. Cl.
*G06F 12/0862* (2016.01)
*G06F 9/30* (2018.01)
*G06F 12/0897* (2016.01)

(52) U.S. Cl.
CPC ...... *G06F 12/0862* (2013.01); *G06F 9/30018* (2013.01); *G06F 12/0897* (2013.01); *G06F 2212/1024* (2013.01)

(58) Field of Classification Search
CPC ............. G06F 12/0862; G06F 9/30018; G06F 12/07897

See application file for complete search history.

(56) References Cited

U.S. PATENT DOCUMENTS

| | | | | |
|---|---|---|---|---|
| 2007/0288697 | A1* | 12/2007 | Keltcher | G06F 12/0862 712/E9.047 |
| 2014/0095796 | A1* | 4/2014 | Bell, Jr. | G06F 12/0855 711/130 |
| 2017/0132134 | A1* | 5/2017 | Gschwind | G06F 12/0862 |
| 2023/0101512 | A1* | 3/2023 | Hughes | G06F 12/0848 712/208 |

* cited by examiner

*Primary Examiner* — Mark A Giardino, Jr.
(74) *Attorney, Agent, or Firm* — Kilpatrick Townsend & Stockton LLP

(57) ABSTRACT

Prefetch circuitry may be configured to transmit a message to cancel a prefetch of one or more cache blocks of a group. The message may correspond to a prefetch message by indicating an address for the group and a bit field for the one or more cache blocks of the group to cancel. In some implementations, the message may target a higher level cache to cancel prefetching the one or more cache blocks, and the message may be transmitted to the higher level cache via a lower level cache. In some implementations, the message may target a higher level cache to cancel prefetching the one or more cache blocks, the message may be transmitted to a lower level cache via a first command bus, and the lower level cache may forward the message to the higher level cache via a second command bus.

20 Claims, 11 Drawing Sheets

| Field | Width | Encoding |
|---|---|---|
| cid | c | The logical client identifier. |
| opcode | 4 | Must be Hint (7). |
| function | 1 | Must be Cancel1k (0). |
| temporal | 3 | The RISC-V temporal specification. |
| address | a - 10 | 1kiB-aligned starting address. |
| mask | 16 | Bit mask of which 64-byte blocks to prefetch. |
| ascending | 1 | The direction in which to traverse the bit mask:<br>1: ascending, 0: descending. |
| read | 1 | 1: request S state (read), 0: request E state (write) |
| data | 1 | 1: request permissions and data,<br>0: request permissions only. |

FIG. 9

CANCELING PREFETCH OF CACHE BLOCKS BASED ON AN ADDRESS AND A BIT FIELD

CROSS-REFERENCE TO RELATED APPLICATION(S)

This application claims priority to and the benefit of U.S. Provisional Patent Application Ser. No. 63/429,921, filed Dec. 2, 2022, and U.S. Provisional Patent Application Ser. No. 63/429,922, filed Dec. 2, 2022, the entire disclosures of which is hereby incorporated by reference.

TECHNICAL FIELD

This disclosure relates generally to integrated circuits and, more specifically, to canceling a prefetch of cache blocks based on an address for a group of cache blocks and a bit field indicating cache blocks in the group.

BACKGROUND

A System-on-Chip (SoC) is an integrated circuit that includes multiple components connected to one another. The components may include, for example, processor cores, caches, cross bars, memory controllers, and memory-mapped devices. The components may be connected so that data can be transferred between them while adhering to a coherence policy, such as the MSI (modified, shared, invalid), MESI (modified, exclusive, shared, invalid), or MOESI (modified, owned, shared, exclusive, invalid) protocol. For example, the components can include agents that are connected to one another using TileLink, a chip-scale interconnect standard that provides multiple clients with coherent memory mapped access to memory and/or server devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 is a table illustrating an example of fields associated with a message to cancel a prefetch of one or more cache blocks in a group.

DETAILED DESCRIPTION

Figure 1:
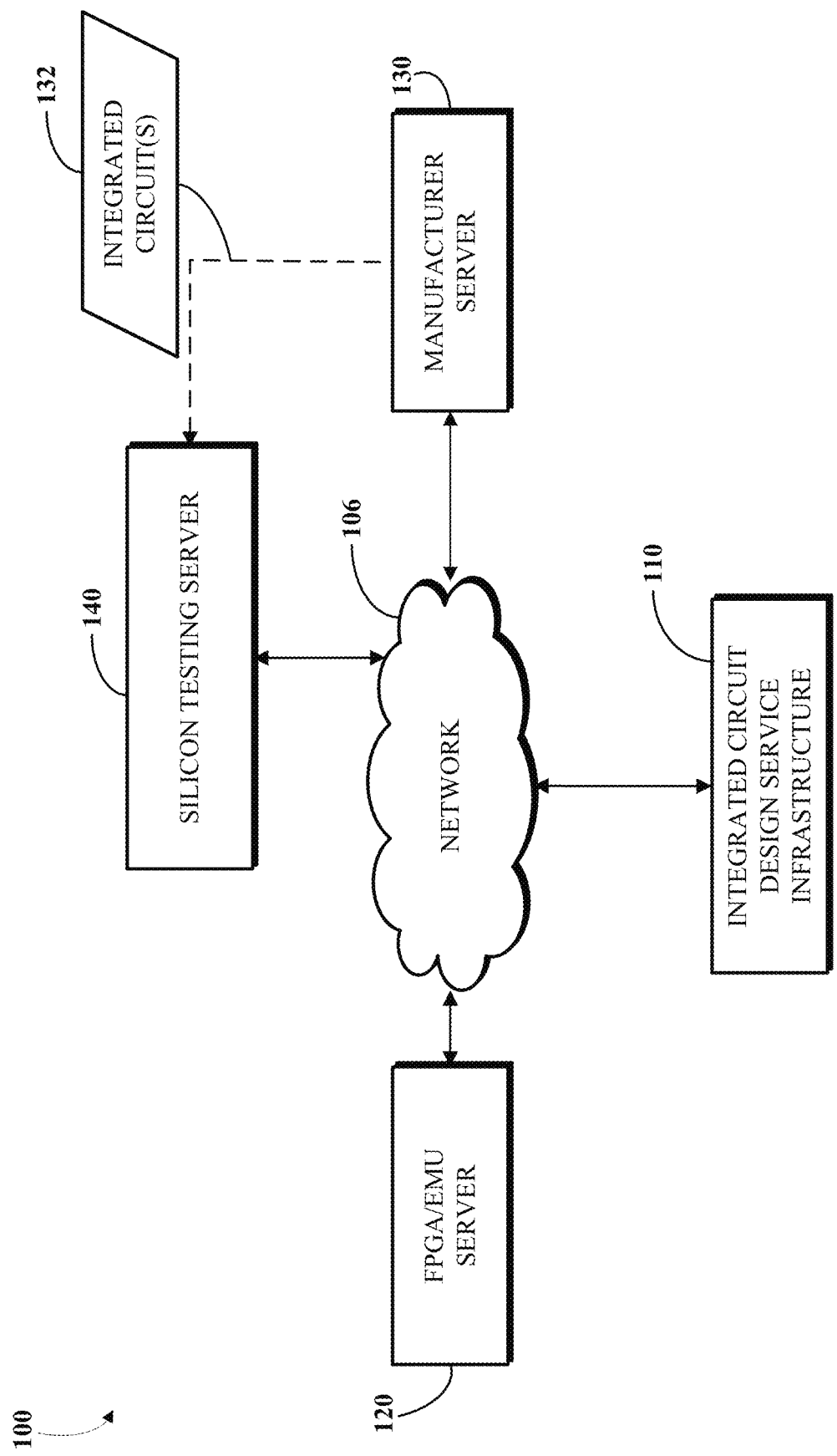
FIG. 1 is a block diagram of an example of a system for facilitating generation and manufacture of integrated circuits.

A central processing unit (CPU) or processor core may experience latency when fetching data from memory (e.g., when fetching instructions or data from cache or main memory). For example, fetching data from memory may involve the processor core initiating a request to a memory controller and waiting for the memory controller to retrieve the data from memory. Additionally, the processor core might compete with other processor cores and/or direct memory access (DMA) controllers for accessing the memory. To reduce latency, the processor core may use a prefetcher to fetch data from memory in advance of when the data may be used by a process executing in the processor core (e.g., a "prefetch," or simply a "fetch"). For example, a kernel of an operating system hosting the process may configure the prefetcher, such as by applying a set of parameters to one or more registers controlling operation of the prefetcher. Configuring the prefetcher may permit controlling how the prefetcher fetches data from memory (e.g., controlling one or more characteristics associated with fetching data from memory). For example, the kernel may configure the prefetcher to control a number of streams that the prefetcher will track, a distance associated with a fetch (e.g., a separation between a prefetch tail pointer and a demand pointer), a window associated with a fetch (e.g., a number of cache lines to detect an address match), and/or a size associated with a fetch.

A processor core can use a prefetcher to prefetch data into a cache so that the data is available sooner for the processor core. To prefetch data, the prefetcher can send a prefetch message targeting a level of cache, such as a level one (L1), level two (L2), or level three (L3) cache. The prefetch message can indicate the data to be prefetched, such as a particular cache block or cache line in a higher level cache.

In some cases, prefetches may cover different amounts of latency in the system based on where the prefetches retrieve data. For example, a prefetch to move data into an L2 cache from an L3 cache might happen closer in time to a demand for the data by the processor core than a prefetch to move data into an L3 cache from main memory, because the latency of accessing the L3 cache may be lower than the latency of accessing the main memory. The prefetcher can pipeline the prefetches so that prefetches to a same cache block are spread out in time. For example, the prefetcher may issue a first prefetch to copy a cache block from main memory to the L3 cache at a first time, then a second prefetch to copy the cache block from the L3 cache to the L2 cache at a second time, then a third prefetch to copy the cache block from the L2 cache to the L1 cache at a third time. A demand by the processor core can then access the cache block in the L1 cache at a fourth time (e.g., an L1 cache hit). As a result, the prefetcher may transmit messages to N different levels of cache in the system via command busses between the N different levels.

In some cases, a prefetch message may compress multiple prefetch commands in a single message (a compressed prefetch message). For example, the prefetch message may indicate an address for a group of cache blocks (e.g., 16 cache blocks) and a bit field indicating the one or more cache blocks of the group to prefetch. A cache receiving the prefetch message may expand the message into individual cache block commands corresponding to fill requests for the one or more cache blocks (e.g., multiple prefetches). This may enable one prefetch message to address up to N (e.g., 16) times the number of cache blocks that may be demanded by a processor core at a given time (e.g., a demand operation by the processor core, such as a Get, Put, or Fill operation). As a result, the prefetch message may enable more bandwidth to be available in the system without adding command busses. In some cases, the prefetch message may be encoded as "Prefetch1K" message, which could have a 1 kilobyte aligned base address and a 16-bit mask of 64 byte cache blocks within that 1 kilobyte region. Spatial locality associated with a prefetch stream may enable compressing the prefetch of multiple cache blocks into the single prefetch message. Prefetching, including the prefetch message, which may be used in connection with a cancel message, is described further in co-pending U.S. patent application entitled "Prefetching Cache Blocks Based on an Address for a Group and a Bit Field," U.S. patent application Ser. No. 18/182,778, which is incorporated herein by reference.

However, in the time between sending a prefetch message to a cache, and the cache expanding the message into fill requests, the prefetcher may determine that it has mis-speculated or mis-predicted with regard to the data that may be needed by the processor core. As a prefetch message may target up to N cache blocks in a single message, expanding the prefetch message into individual cache block commands may consume more time than a prefetch for a single cache block would consume. As a result, the cache may utilize power and bandwidth to retrieve data that may no longer be useful.

Implementations of this disclosure address problems such as these by encoding a cancel message to cancel a prefetch of one or more cache blocks of a group of cache blocks (e.g., 16 cache blocks at a range of addresses) in a single message. The cancel message may correspond to a prefetch message by indicating an address for the group and a bit field for the one or more cache blocks of the group to cancel. This may enable the cancel message to address up to N (e.g., 16) times the number of cache blocks that may be demanded by a processor core at a given time (e.g., a demand operation, such as a Get, Put, or Fill operation). As a result, the cancel message may enable the system to save power and bandwidth by not executing fill requests to retrieve data that may no longer be useful. This may enable other requests to make progress sooner, increasing the overall performance of the system. The cancel message may have the same fields as the prefetch message, and an agent may send the cancel message in an attempt to abort any unissued fill operations from a prior prefetch message that matches the cancel message. In some implementations, the cancel message may be encoded as a "Cancel1K" message, which could have a 1 kilobyte aligned base address and a 16-bit mask of 64 byte cache blocks within that 1 kilobyte space. In some implementations, the Cancel1K message may have the same fields as the Prefetch1K message.

To describe some implementations in greater detail, reference is first made to examples of hardware and software structures used to implement a system including components that may cancel a prefetch of one or more cache blocks based on an address for a group of cache blocks and a bit field indicating the one or more cache blocks in the group. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to message the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/ mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit (s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
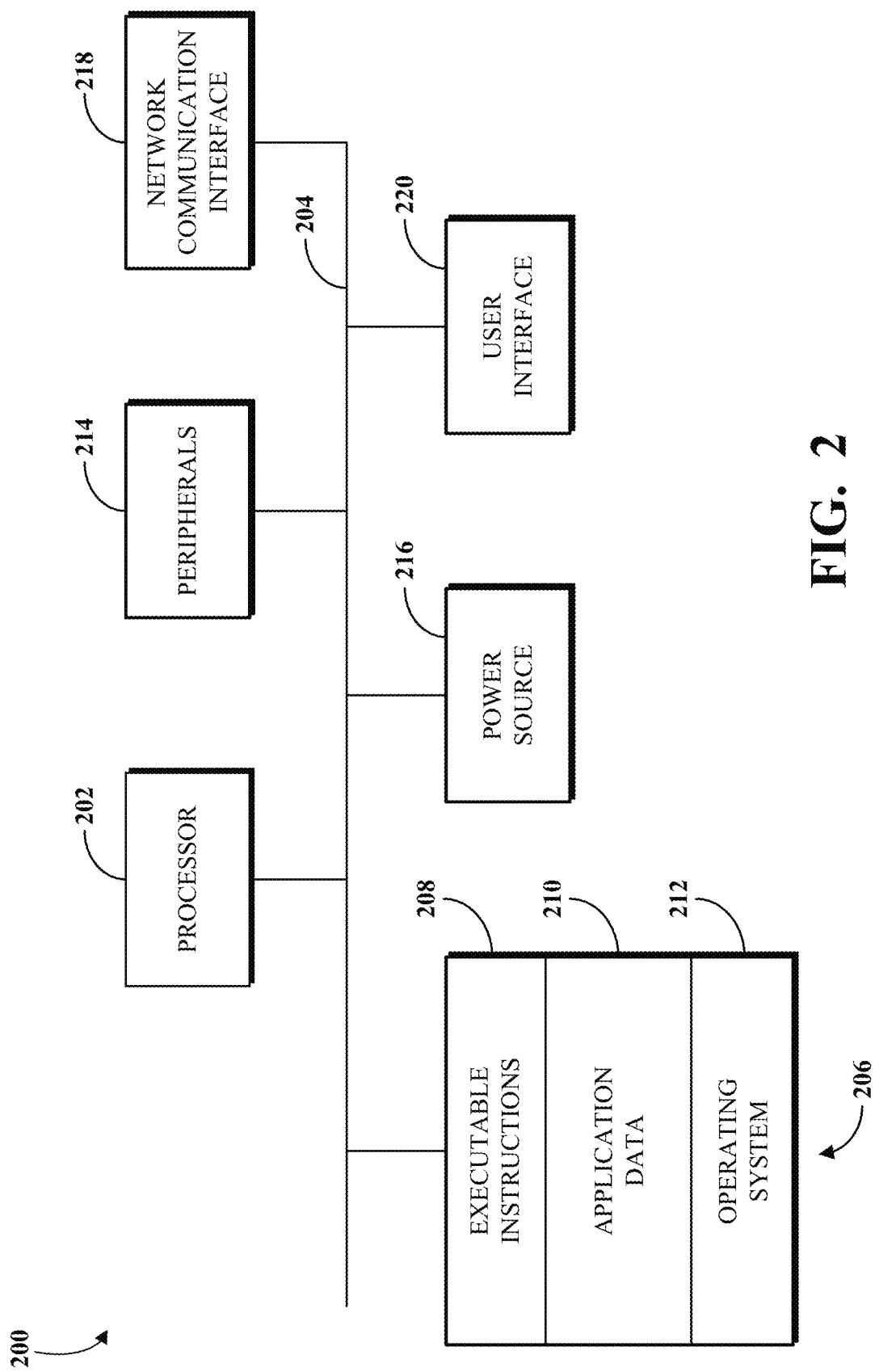
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a message, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
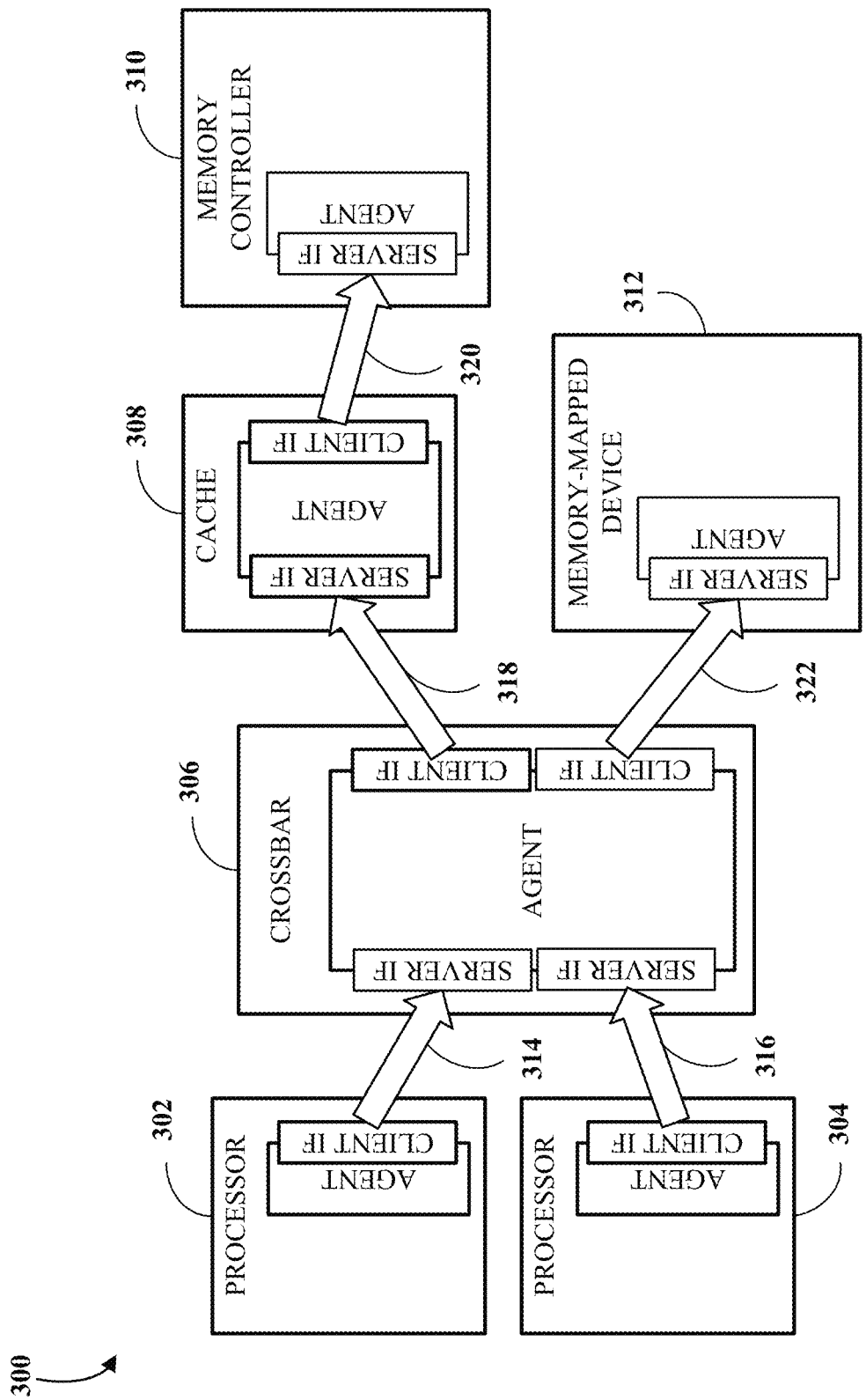
FIG. 3 is a block diagram of an example of a system including components that may transmit a message to cancel a prefetch of one or more cache blocks.

FIG. 3 is a block diagram of an example of a system 300 including components that may transmit a message to cancel a prefetch of one or more cache blocks. The system 300 could be implemented, for example, by an SoC. The components may include, for example, a first processor core 302 (e.g., which may include a private cache, implementing a data storage such as an SRAM), a second processor core 304 (e.g., which may include another private cache, implementing another data storage such as another SRAM), a cross bar 306, a cache 308 (e.g., a shared cache, implementing another data storage such as another SRAM), a memory controller 310 (e.g., a memory, implementing a data storage such as a DRAM), and a memory-mapped device 312. The components may be connected so that data stored in cache blocks can be transferred between them while adhering to a cache coherence policy, such as one of the MSI, MESI, or MOESI policies. For example, the components can include agents that are connected to one another so that messages involving data can be transferred between them (e.g., sending and receiving) while adhering to the cache coherence policy. For example, the agents may be connected to one another using TileLink, a chip-scale interconnect standard that provides multiple masters with coherent memory mapped access to memory and/or server devices.

The agents implemented by the components may implement point-to-point links for communicating the messages to one another. The messages may include, for example, messages associated with requests (e.g., requests for data, evictions of data, and probes for data), responses (e.g., transferring data), and acknowledgements. An agent may implement one or more client interfaces and/or one or more server interfaces for communicating the messages. An agent with a client interface (e.g., a client agent) may request an agent with a server interface (e.g., a sever agent) to perform memory operations, or may request permission to transfer and cache copies of data. An agent with a server interface may manage permissions and access to a range of addresses, including performing memory operations on behalf of requests arriving from a client interface. Thus, connected agents may send and receive messages over links to perform operations on shared address space, such as fill operations, probe operations, and evict operations.

For example, in the system 300, the first processor core 302 and the second processor core 304 may each include an agent having a client interface. The cross bar 306 may include an agent having a first server interface, a second server interface, a first client interface, and a second client interface (e.g., the cross bar 306 may be a server and a client, or servent). The client interface of the first processor core 302 may connect to the first server interface of the cross bar 306 by a link 314. The client interface of the second processor core 304 may connect to the second server interface of the cross bar 306 by a link 316. The cache 308 may include an agent having a server interface and a client interface (e.g., the cache 308 may also be a servent). The first client interface of the cross bar 306 may connect to the server interface of the cache 308 by a link 318. The memory controller 310 may include an agent having a server interface. The client interface of the cache 308 may connect to the server interface of the memory controller 310 by a link 320. The memory-mapped device 312 may include an agent having a server interface. The second client interface of the cross bar 306 may connect to the server interface of the memory-mapped device 312 by a link 322. The agents implemented by the first processor core 302, the second processor core 304, the cross bar 306, the cache 308, the memory controller 310, and the memory-mapped device 312, may send and receive messages over their respective links (e.g., the links 314, 316, 318, 320, and 322) to perform operations on shared address space.

Figure 4:
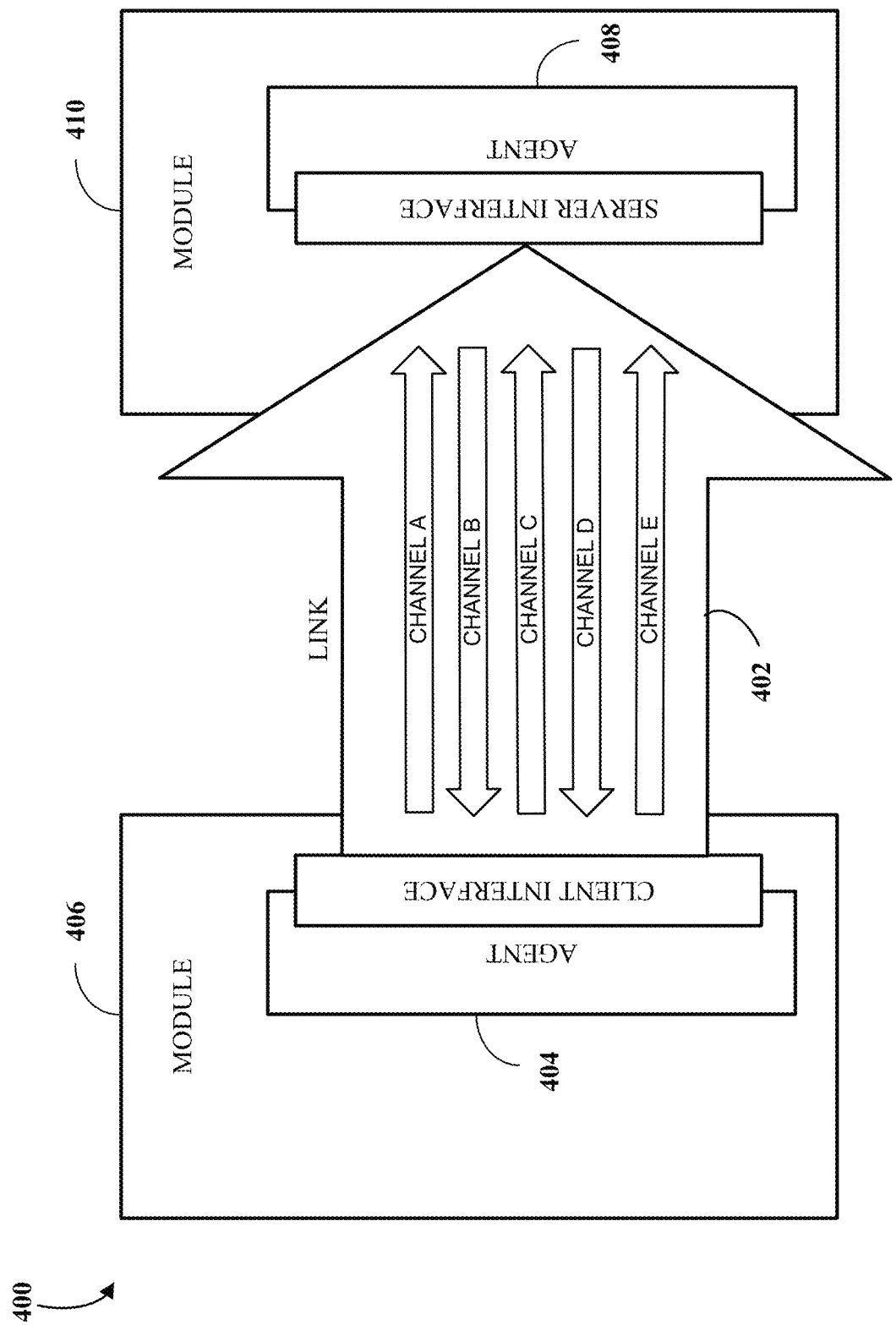
FIG. 4 is a block diagram of an example of a link between agents implemented by components.

FIG. 4 is a block diagram of an example of a link 402 between agents implemented by components in a system 400, such as an agent 404 implemented by a first component 406 and an agent 408 implemented by a second component 410. For example, the link 402 could be one of the links, 314, 316, 318, 320, or 322 shown in FIG. 3. The link 402 may be used to cancel a prefetch of one or more cache blocks based on an address for a group of cache blocks and a bit field indicating the one or more cache blocks in the group.

The agent 404 implemented by the first component 406 may include a client interface (e.g., the agent 404 may be a client agent that is also an inner agent), and the agent 408 implemented by the second component 410 may include a server interface (e.g., the agent 408 may be a server agent that is also an outer agent). For example, the first component 406 could be the first processor core 302, and the second component 410 could be the cross bar 306, the cache 308, or the memory controller 310. The client interface of the agent 404 may connect to the server interface of the agent 408 by the link 402. The connected agents 404 and 408 may send and receive messages to one another over point-to-point channels of the link 402, such as one of the Channel A through E implemented by the link 402. For example, the agents 404 and 408 may send and receive messages to perform operations on a shared address space, such as fill operations, probe operations, and evict operations. An operation may include, for example, a change to an address range's data values, permissions, or location in a memory hierarchy. A message may include a set of control and data values sent over a particular channel (e.g., one of the Channel A through E). The channels may be logically independent from one another for communicating the messages. A priority may be specified among the channels, such as a prioritization in which messages on Channel A have a lowest priority with messages on Channel E having a highest priority (e.g., a prioritization of Channels A<B<C<D<E for messages across the channels). The channels may contain transaction control signals and a bus for exchanging data (e.g., a physical bus implemented by wires and having a particular data width, such as 128 bits). The channels may be directional, in that each channel may pass messages either from a client interface to a server interface or from a server interface to a client interface.

For example, Channel A may enable the agent having the client interface (e.g., the agent 404) to transmit a request to the agent having the server interface (e.g., the agent 408), such as a request that an operation be performed on a specified address range, such as accessing or caching data, or evicting data with a lower priority (e.g., a low priority evict). Channel B may enable the agent having the server interface (e.g., the agent 408) to transmit a request to the agent having the client interface (e.g., the agent 404), such as a request that an operation be performed at an address cached by a client (e.g., the agent 404), such as for accessing or writing back cached data or probing cached data at an address (e.g., a probe). Channel C may enable the agent having the client interface (e.g., the agent 404) to transmit to the agent having the server interface (e.g., the agent 408) data, an acknowledgment message in response to the request, or evicting data with a higher priority (e.g., a high priority evict). Channel D may enable the agent having the server interface (e.g., the agent 408) to transmit a data response or acknowledgement message back to the client (e.g., the agent 404). Channel E may enable the agent having the client interface (e.g., the agent 404) to transmit back to the agent having the server interface (e.g., the agent 408) a final acknowledgment of a cache line or block transfer from the requestor (e.g., the agent 404).

Figure 5:
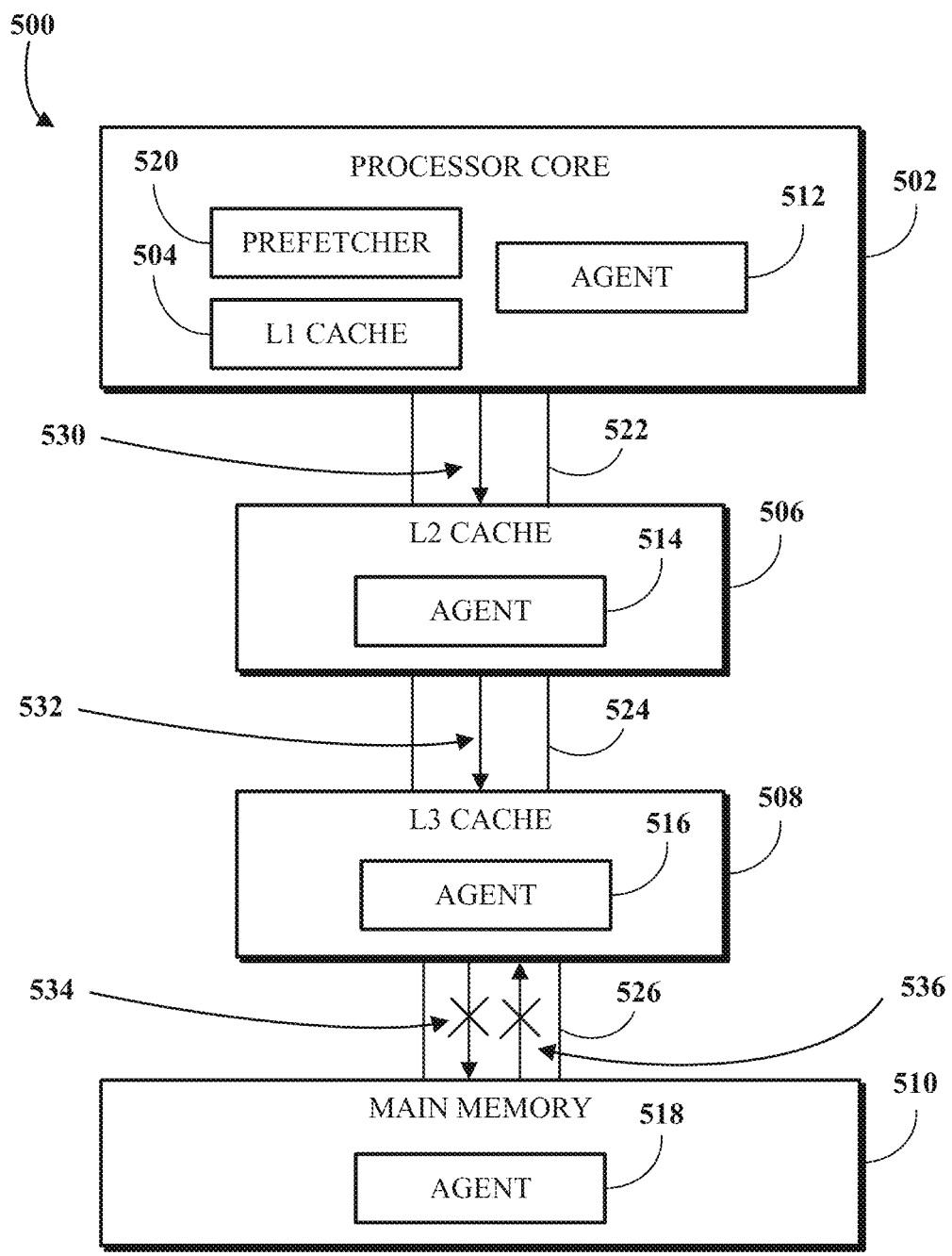
FIG. 5 is a block diagram of an example of a system including prefetch circuitry for canceling a prefetch of one or more cache blocks in a group.

FIG. 5 is a block diagram of an example of a system 500 including prefetch circuitry 520 (e.g., a prefetcher) for prefetching and/or canceling a prefetch of one or more cache blocks in a group. The system 500 may include components having agents as described in FIG. 3. The components may be arranged in a memory hierarchy. For example, the components may include a processor core 502, an L2 cache 506, an L3 cache 508, and a main memory 510. The processor core 502 may include an L1 cache 504. While three levels of cache are shown in the system 500 by way of example, in other implementations, the memory hierarchy may include more levels of cache (e.g., a level 4 (L4) cache) or fewer levels of cache (e.g., deleting the L3 cache 508). The components could be implemented together in an integrated circuit, such as an SoC. Thus, the memory hierarchy in the system 500 may include the L1 cache 504, the L2 cache 506, the L3 cache 508, and the main memory 510.

The processor core 502 may include an agent 512, like the first processor core 302 of FIG. 3. The L2 cache 506 may include an agent 514, and the L3 cache 508 may include an agent 516, like instances of the cache 308 of FIG. 3. The main memory 510 may include an agent 518, like the memory controller 310 of FIG. 3. The agents 512, 514, 516, and 518 may include circuitry for communicating with one another through links. For example, the agent 512 may communicate with the agent 514 via a first link 522, the agent 514 may communicate with the agent 516 via a second link 524, and the agent 516 may communicate with the agent 518 via a third link 526. In some implementations, the first link 522, the second link 524, and the third link 526 may be like the link 402 of FIG. 4. In some implementations, the links may include a command bus for carrying non-data message fields and a data bus for carrying optional message data payloads (e.g., the agents may communicate messages and data via the message and data busses implemented between them).

The prefetch circuitry 520 may be used by the processor core 502 to transmit messages to generate prefetches targeting different levels of cache (e.g., targeting cache blocks for storage in the L1 cache 504, the L2 cache 506, or the L3 cache 508). In some cases, a prefetch may cover a different amount of latency in the system 500 based on where the prefetch retrieves data. For example, a prefetch to move data (e.g., a cache block, or cache line, which could include 64 bytes of data) into the L2 cache 506 from the L3 cache 508 might happen closer in time to a demand for the data by the processor core 502 than a prefetch to move data into the L3 cache 508 from the main memory 510, because the latency of accessing the L3 cache 508 may be lower than the latency of accessing the main memory 510. As a result, the prefetch circuitry 520 can pipeline the prefetches so that prefetches to a same cache block are spread out in time. For example, the prefetch circuitry 520 may issue a first prefetch to copy a cache block from the main memory 510 to the L3 cache 508 at a first time, then a second prefetch to copy the cache block from the L3 cache 508 to the L2 cache 506 at a second time, then a third prefetch to copy the cache block from the L2 cache 506 to the L1 cache 504 at a third time. A demand by the processor core 502 can then access the cache block in the L1 cache 504 at a fourth time (e.g., a hit in the L1 cache 504).

In the time between sending a prefetch message and the associated prefetch transforming into a fill request for data, the prefetch circuitry 520 may determine that it has mis-speculated or mis-predicted with regard to the data. If a prefetch is no longer useful, the system 500 may utilize power and bandwidth executing a fill request for data that might not be used. The prefetch circuitry 520 may encode a cancel message to cancel a prefetch of one or more cache blocks of a group of cache blocks (e.g., 16 cache blocks at a range of addresses) in a single message. This may enable the message to address up to N (e.g., 16) times the number of cache blocks that may be demanded by the processor core 502 at a given time (e.g., a demand operation, such as a Get, Put, or Fill operation). In some implementations, compressed prefetch messages that target up to N (e.g., 16) cache blocks in a message may be sent (e.g., a Prefetch1K message, which could have a 1 kilobyte aligned base address and a 16-bit mask of 64 byte cache blocks within that 1 kilobyte space), and an agent can send the cancel message to abort any unissued fill operations from a prior prefetch that matches the cancel (e.g., a prior Prefetch1K that matches the Cancel1K). In some implementations, the prefetch circuitry 520 may be configured to transmit the message (e.g., the cancel message, transmitted by a message via a link, such as the first link 522, the second link 524, or the third link 526) to cancel a prefetch of one or more cache blocks of a group of cache blocks. The message may indicate an address for the group of cache blocks (e.g., 16 cache blocks at a range of addresses) and a bit field (e.g., the 16-bit mask) indicating the one or more cache blocks of the group of cache blocks to cancel prefetching.

The prefetch circuitry 520 may target any level of cache, such as a next level cache like the L2 cache 506, or a higher level cache like L3 cache 508, to cancel a prefetch of one or more cache blocks to that cache. For example, when targeting a higher level cache, such as the L3 cache 508, the prefetch circuitry 520 may transmit a message to cancel a prefetch of one or more cache blocks of a group of cache blocks to a lower level of cache, such as the L2 cache 506. The prefetch circuitry 520 may transmit the message by agent 512 transmitting a message 530 to agent 514 (e.g., via a command bus of the first link 522). The message may include a hint field that indicates a level of cache that the cancel is targeting (e.g., the L3 cache 508), an address for the group of cache blocks (e.g., a 1 kilobyte region, starting at an address aligned with 16 cache blocks), and a bit field indicating the one or more cache blocks of the group of cache blocks to cancel. The message, based on the hint field, may cause agent 514 (associated with the L2 cache 506) to forward the message to agent 516 (associated with the L3 cache 508, via a command bus of the second link 524). For example, agent 514 may forward the message by transmitting a message 532 to agent 516 (e.g., via a command bus of the second link 524).

The agent 516 may determine whether to apply the message to cancel prefetching or to ignore the message (e.g., a hint in the system 500). For example, the agent 516 may make the determination to apply the message based on whether a fill request has already issued for the one or more cache blocks. For example, a prefetch message may be partially executed when receiving a cancel message (e.g., the cancel message may be received after the prefetch message is expanded into individual cache block commands, but before issuing into fill requests to retrieve data). If the agent 516 determines to apply the message, the message (e.g., based on the hint field, the address, and the bit field) may cause agent 516 (e.g., associated with the L3 cache 508) to cancel a prefetch of the one or more cache blocks from the next level in the memory hierarchy (e.g., to abort retrieval of data from the agent 518, associated with the main memory 510). For example, the agent 516 may abort sending a fill request 534 for requesting the data corresponding to the one or more cache blocks of the group of cache blocks in the 1 kilobyte region (e.g., no fill request is sent via a command bus of the third link 526, indicated by a first "X" in FIG. 5). As a result, the agent 518 may avoid transmitting a fill grant 536 with the data (e.g., no data is sent via a data bus of the third link 526, indicated by a second "X" in FIG. 5). Thus, by encoding a cancel message to cancel a prefetch of one or more cache blocks of a group, the prefetch circuitry 520 can target cancellations in different caches, addressing N times the number of cache blocks in a single message.

Figure 6:
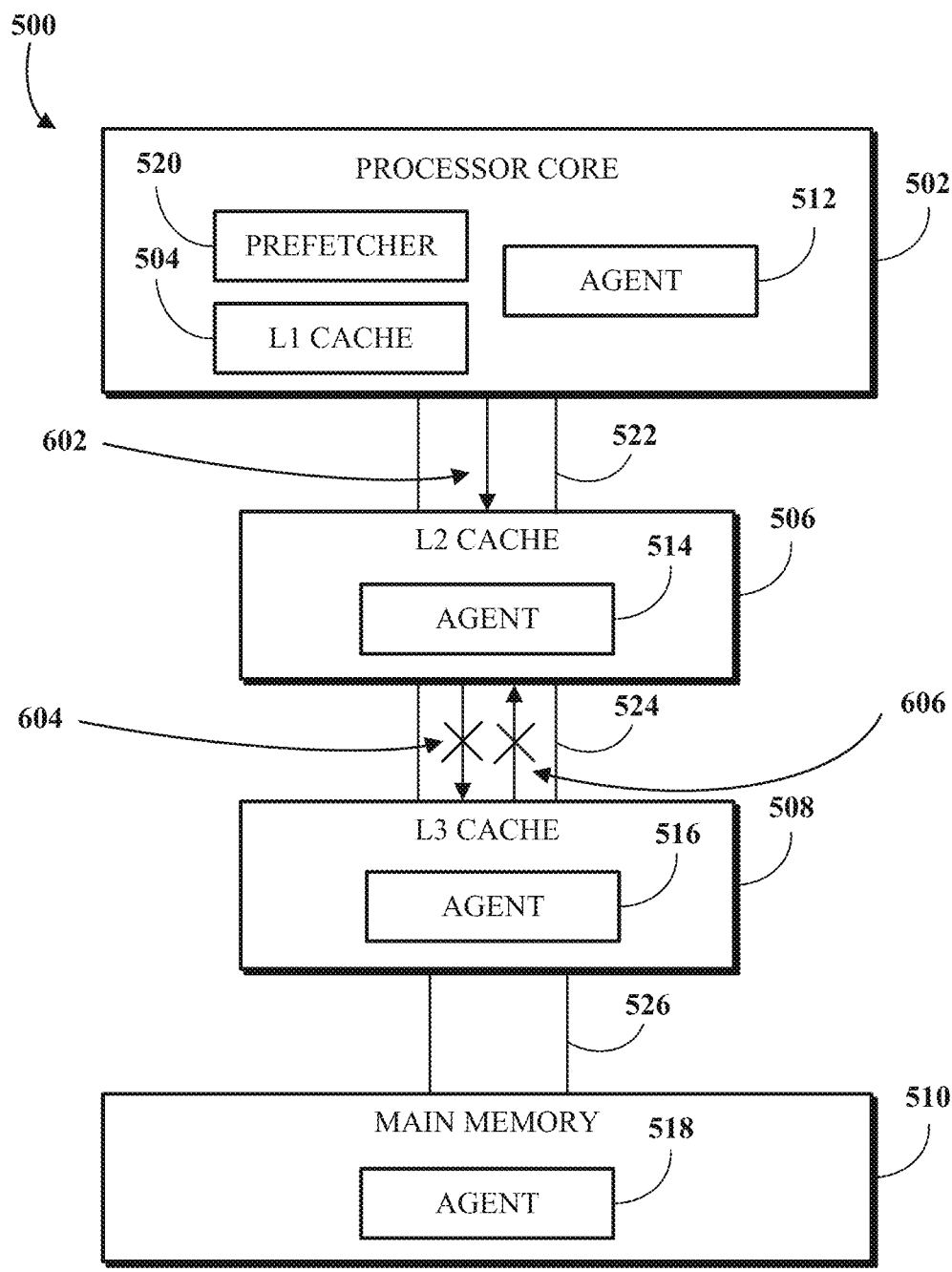
FIG. 6 is a block diagram of another example of a system including prefetch circuitry for canceling a prefetch of one or more cache blocks in a group.

FIG. 6 is a block diagram of another example of the system 500 for canceling a prefetch of one or more cache blocks in a group. In addition to, or in lieu of, the message 530 transmitted by the prefetch circuitry 520 to agent 514 as shown in FIG. 5, the prefetch circuitry 520 may transmit a message 602 to agent 514 to target another level of cache to cancel a prefetch of one or more cache blocks to that cache. For example, the prefetch circuitry 520 may issue a first cancellation, e.g., via the message 530 in FIG. 5, to avoid copying a first cache block from the main memory 510 to the L3 cache 508, then a second cancellation, e.g., via the message 602 in FIG. 6, to avoid copying a second cache block from the L3 cache 508 to the L2 cache 506. The prefetch circuitry 520 may transmit the message by agent 512 transmitting the message 602 to agent 514 (e.g., via the command bus of the first link 522). The message may include a hint field that indicates a level of cache that the cancel is targeting (e.g., the L2 cache 506), an address for the group of cache blocks (e.g., a 1 kilobyte region, starting at an address aligned with 16 cache blocks), and a bit field indicating the one or more cache blocks of the group of cache blocks to cancel prefetching).

The agent 514 may determine whether to apply the message to cancel prefetching or to ignore the message (e.g., another hint in the system 500). For example, the agent 514 may make the determination to apply the message based whether a fill request has already issued for the one or more cache blocks (e.g., the prefetch message being partially executed, or after execution of the prefetch message begins by expanding the prefetch message into individual cache block commands and before completion of execution of the prefetch message by issuing fill requests to retrieve data). If the agent 514 determines to apply the message, the message (e.g., based on the hint field, the address, and the bit field) may cause agent 514 (associated with the L2 cache 506) to cancel prefetching the one or more cache blocks from the next level in the memory hierarchy (e.g., to abort retrieval of data from the agent 516, associated with the L3 cache 508). For example, the agent 516 may abort sending a fill request 604 for requesting the data corresponding to the one or more cache blocks of the group of cache blocks in the 1 kilobyte region (e.g., no fill request is sent via the command bus of the second link 524, indicated by a first "X" in FIG. 6). As a result, the agent 516 may avoid transmitting a fill grant 606 with the data (e.g., no data is sent via the data bus of the second link 524, indicated by a second "X" in FIG. 6).

Figure 7:
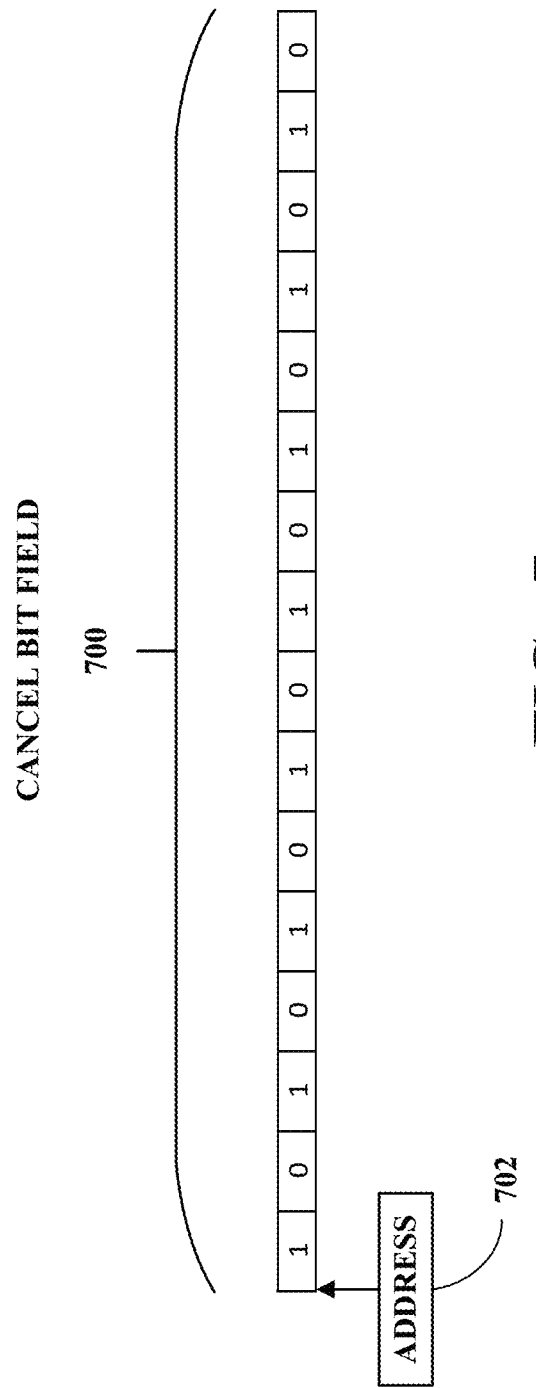
FIG. 7 is a diagram of an example of a bit field.

FIG. 7 is a diagram of an example of a bit field 700. The bits in the bit field 700 may correspond to cache blocks located in an addressable region of memory, beginning at a base address 702 (e.g., an offset) aligned with a first cache block. For example, the bit field 700 could be a 16-bit bit field, programmed by a 16-bit mask, corresponding to 16 cache blocks or cache lines. A cache block could include, for example, 64 bytes in a region of addressable memory starting at the base address 702, such as a 1 kilobyte region. The bit field 700 may match a bit field used by a prefetch message. An agent (e.g., the agent 512) can configure a cancel message by programming a bit mask to set the bit field 700 and by programming the address 702. The agent can then send the cancel message to cause another agent (e.g., the agent 516) to cancel the prefetch of one or more cache blocks of a group based on the address 702 and the bits that are set in the bit field 700 (e.g., a bit that is set may correspond to a cache block in which prefetching is aborted, while a bit that is cleared may correspond to a cache block in which prefetching may continue to the extent the prefetching is in progress). For example, an agent could configure the bit field 700 by setting every other bit to "1." As a result, this configuration could cause the other agent, when receiving the prefetch message, to cancel the prefetch of every other cache block, starting at the address 702, in the region of addressable memory (e.g., cancel prefetching 8 cache blocks, based on a single message). In some implementations, the bit field 700 and the address 702 may be programmed by prefetch circuitry, such as the prefetch circuitry 520. In some implementations, the bit field 700 and the address 702 may be programmed by instructions executed by a processor core, such as RISC-V instructions executed by the processor core 502.

Figure 8:
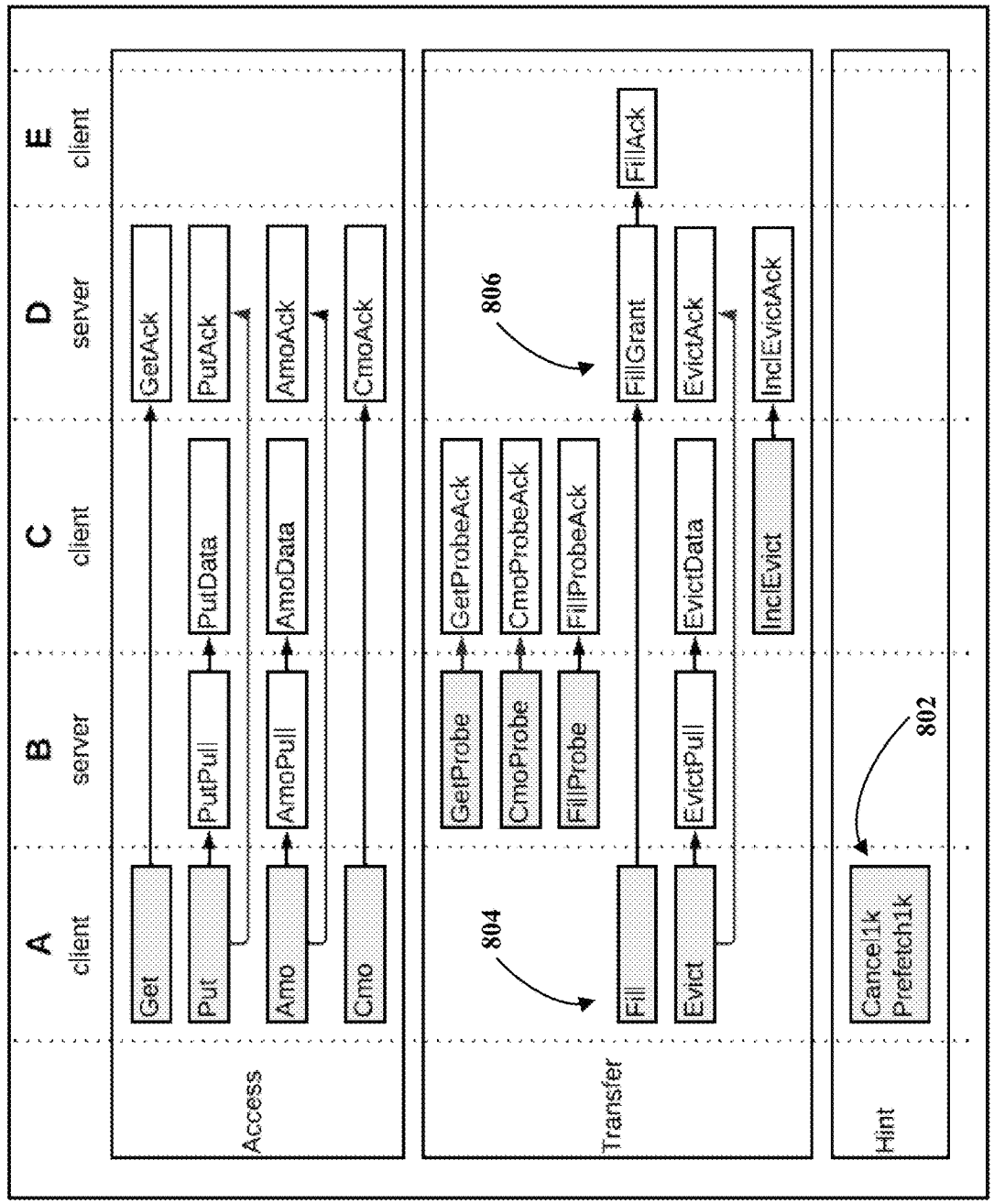
FIG. 8 is a diagram of an example of messages communicated between agents.

FIG. 8 is a diagram 800 of an example of messages that may be communicated between agents. The messages may be communicated through a link, such as any of the links 314, 316, 318, 320, and 322 shown in FIG. 3, the link 402 shown in FIG. 4, and any of the first link 522, the second link 524, and the third link 526 shown in FIGS. 5 and 6. The messages may be communicated between agents having client interfaces and server interfaces, such as agents implemented by the first processor core 302, the second processor core 304, the cross bar 306, the cache 308, the memory controller 310, and the memory-mapped device 312 shown in FIG. 3, agents implemented by the components 406 and 410 shown in FIG. 4, and the agents 512, 514, 516, and 518 shown in FIGS. 5 and 6.

The messages may be communicated through channels associated with priorities, such as the Channels A, B, C, D, and E shown in columns, having prioritization of Channels A<B<C<D<E for messages across the channels, as shown in FIG. 4. For example, an agent having a client interface (e.g., a client agent) may send a message having a lowest priority via Channel A. An agent having a server interface (e.g., a server agent) may send a message having a next lowest priority via Channel B (e.g., having a higher priority than Channel A). The agent having the client interface (e.g., the client agent) may send a message having a next lowest priority via Channel C (e.g., having a higher priority than Channels A and B). The agent having the server interface (e.g., the server agent) may send a message having a next lowest priority via Channel D (e.g., having a higher priority than Channels A, B, and C). The agent having the client interface (e.g., the client agent) may send a message having a highest priority via Channel E (e.g., having a higher priority than Channels A, B, C, and D). Some agents may have both a client interface and a server interface and therefore may function as a server at times and a client at times (e.g., the agent may be a servent, such as the agent 514 or the agent 516 shown in FIGS. 5 and 6).

A box in a column of the diagram 800 may indicate a possible message sent by an agent through a channel corresponding to the column including the box. For example, a box 802 including "Cancel1K" may indicate a cancel message that may be sent by a client agent (e.g., agent 512) via Channel A. A series of boxes in columns of the diagram 800 may indicate a possible operation between agents, comprising a sequence of multiple messages, communicated through a given link using multiple channels. For example, a box 804 labeled "Fill" may indicate a fill request that may be sent by a client agent (e.g., agent 516, transmitting a fill request) via Channel A, and a box 806 labeled "FillGrant" may indicate a fill grant that may be sent by a server agent (e.g., agent 518, transmitting a fill grant) via Channel D, in one operation, to the extent such Fill and FillGrant are not aborted due to a Cancel1K.

FIG. 9 is a table 900 illustrating an example of fields associated with a message to cancel a prefetch of one or more cache blocks in a group. The message may comprise a "hint" operation used to pass information from one location to another. The information may provide a suggestion or recommendation that may be helpful to improve performance. The hint operation may comprise a single posted message. The hint operation can flow from a client to a server as an A priority message. A recipient of a hint message can discard the hint without taking any further action (e.g., the agent can elect to perform the prefetch, and not cancel the prefetch). There may be multiple hint operations to transfer information between two agents, which behavior may be defined by the function field in the hint message. For example, hint operations may include a cancel message (e.g., "Cancel1K"), which may indicate that speculatively issued hints of any kind may be cancelled, and/or a prefetch message (e.g., "Prefetch1K") which may indicate that system performance may benefit if a targeted agent were to pre-fill the cache blocks indicated by the prefetch hint.

In some implementations, if hints are issued speculatively, and are later determined to be mis-speculated, it may be desirable to cancel the hints before the hints have been acted upon. A cancel operation may attempt to abort a prior hint operation with matching attributes. However, a cancel operation may not guarantee cancellation of any particular hint before the hint is applied at a particular cache. The cancel message (e.g., "Cancel1K") may be a hint operation that sends the following information to a caching agent: address, mask, read, data, temporal, and ascending. The address (e.g., the address 702) may provide a starting address, for example, to a 1-kilobyte-aligned region of cacheable memory. The mask could be, for example, 16 bits for programming a bit field (e.g., the bit field 700) and may provide one bit for every 64-byte block in the 1 kilobyte region. For each bit i set in the mask, the hint may suggest that the selected caching agent cancel any outstanding hints related to the blocks of memory in question issued from the same client (e.g., a 64-byte block starting at address+i*64). The read and data bits may indicate what a type of prefetch operation that is intended to be cancelled. The temporal hint field may give an indication of where to cancel the allocation of cache blocks requested by a previous hint. For example, the temporal hint field could have values of: NONE (e.g., no hint provided), NTL.P1 (e.g., non-temporal access; does not exhibit temporal locality within the capacity of the innermost level of cache in the memory hierarchy), NTL.PALL (e.g., non-temporal access; does not exhibit temporal locality within the capacity of any level of private cache in the memory hierarchy), NTL.S1 (e.g., non-temporal access; does not exhibit temporal locality within the capacity of the innermost level of shared cache in the memory hierarchy), and NTL.ALL (e.g., non-temporal access; does not exhibit temporal locality within the capacity of any level of cache in the memory hierarchy). See, e.g., RISC-V "Zihintntl" non-temporal locality hints extension. As a result, the temporal hint field may enable the cancel message to indicate a level of cache that the cancel is targeting (e.g., the L2 cache 506 or the L3 cache 508 of FIGS. 5 and 6), and may enable an agent to process the message accordingly (e.g., forward the cancel, perform the cancel, or ignore the cancel). The ascending bit may indicate if the cancel should process the block mask in ascending (1) or descending (0) order. For example, a cancel with address of 0x400, mask of 0x8003, and an ascending of 1 could first cancel a prefetch to address 0x400 followed by 0x440 and finishing with 0x7C0. If the ascending bit were 0, the cancellation of cache blocks could happen in the opposite order: 0x7C0,0x440, and 0x400. In some implementations, with a sliced next level cache, the interconnect could replicate a cancel message (e.g., the Cancel1k message) to multiple receivers.

Figure 10:
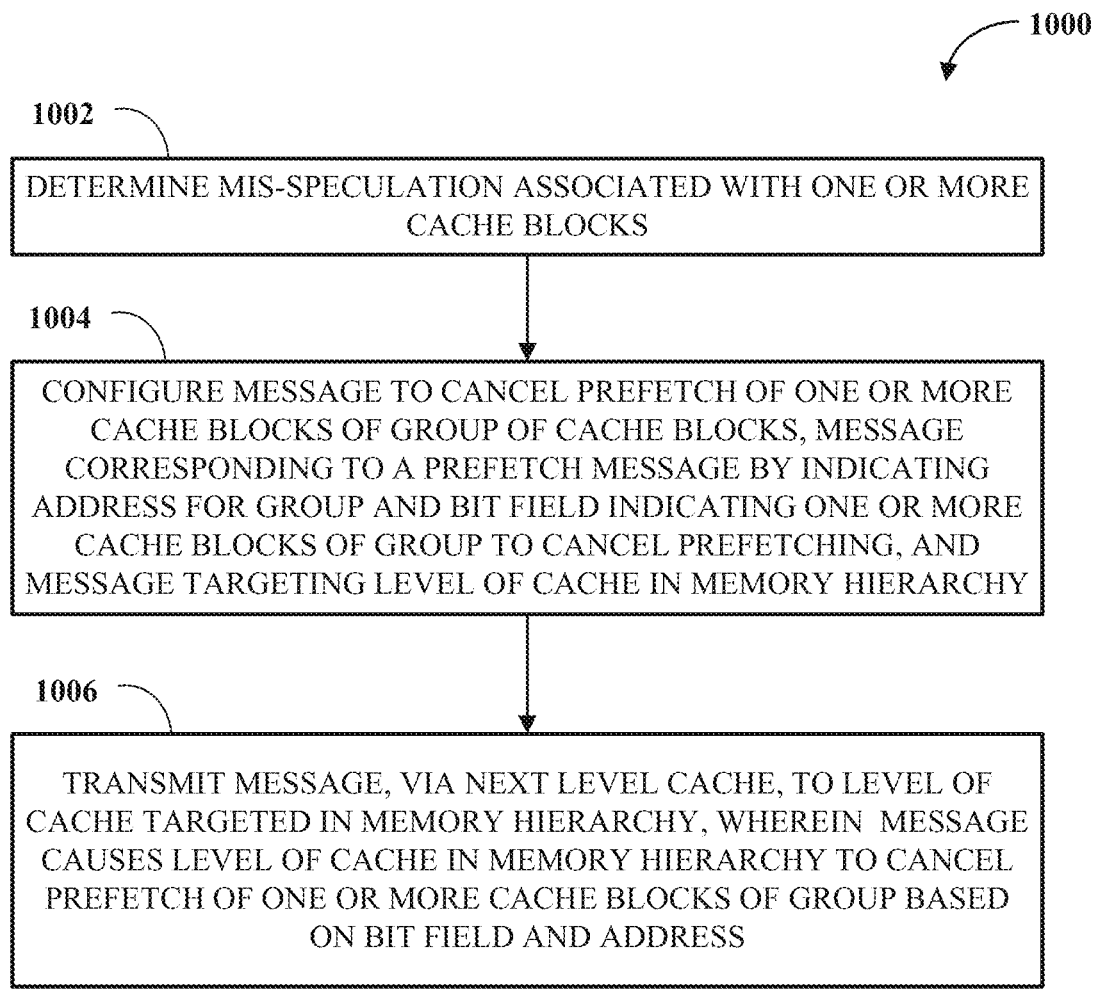
FIG. 10 is a flow chart of an example of a technique for canceling a prefetch of one or more cache blocks in a group.

To further describe some implementations in greater detail, reference is next made to examples of techniques which may be performed by canceling a prefetch of one or more cache blocks in a group. FIG. 10 is a flow chart of an example of a technique 1000 for canceling a prefetch. The technique 1000 can be performed, for example, using the systems, hardware, and software described with respect to FIGS. 1-9. The steps, or operations, of the technique 1000 or another technique, method, process, or algorithm described in connection with the implementations disclosed herein can be implemented directly in hardware, firmware, software executed by hardware, circuitry, or a combination thereof. For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, prefetch circuitry (e.g., the prefetch circuitry 520) may determine a mis-speculation or mis-prediction associated with one or more cache blocks of a group (e.g., the prefetch circuitry 520 may determine that it has mis-speculated or mis-predicted). For example, the prefetch circuitry could make such a determination based on the execution of a processor core, such as the processor core 502. If a prefetch of one or more cache blocks is no longer useful, the prefetch circuitry may attempt to abort the prefetch of the one or more cache blocks, so as to conserve power and bandwidth in the system, by sending a cancel message (e.g., a cancellation hint, such as Cancel1K).

At 1004, the prefetch circuitry may configure the cancel message to cancel the prefetch of one or more cache blocks of a group of cache blocks. The message may correspond to a prefetch message by indicating an address for the group (e.g., the address 702, or the "address" field in the table 900) and a bit field indicating the one or more cache blocks of the group of cache blocks to cancel prefetching (e.g., the "mask" field in the table 900). The message may also indicate a hint field that indicates a level of cache in the memory hierarchy that the cancel is targeting (e.g., the "temporal" field in the table 900).

At 1006, the prefetch circuitry may transmit the message to a next level cache. In some cases, the prefetch circuitry may transmit the message, via the next level cache, to another level of cache that is targeted in a memory hierarchy. For example, the prefetch circuitry 520 may transmit the message via the L2 cache 506 when targeting the L3 cache 508 in the memory hierarchy. The message may cause the next level of cache in the memory hierarchy to forward the message based on the hint field. For example, the L2 cache 506 may forward the message to the L3 cache 508 based on the hint field. The message may cause the level of cache that is targeted to cancel the prefetch of the one or more cache blocks based on the bit field and the address. For example, the message may cause the L3 cache 508 to cancel the prefetch of one or more cache blocks of a group based on the bit field and the address.

In some implementations, the prefetch circuitry may utilize a timer to prevent the transmission of a cancel message that may be too late. For example, a cancel may be too late when a receiving agent has already transmitted a fill request to retrieve the data. In this case, when the receiving agent receives the cancel message, the receiving agent might ignore the cancel message based on the fill request already having been issued. When the prefetch circuitry determines, based on the timer, that the receiving agent may ignore the message (e.g., based on a timing in which the fill request may have already issued by the receiving agent), the prefetch circuitry may prevent transmission of the cancel message. This may conserve bandwidth in the system.

Figure 11:
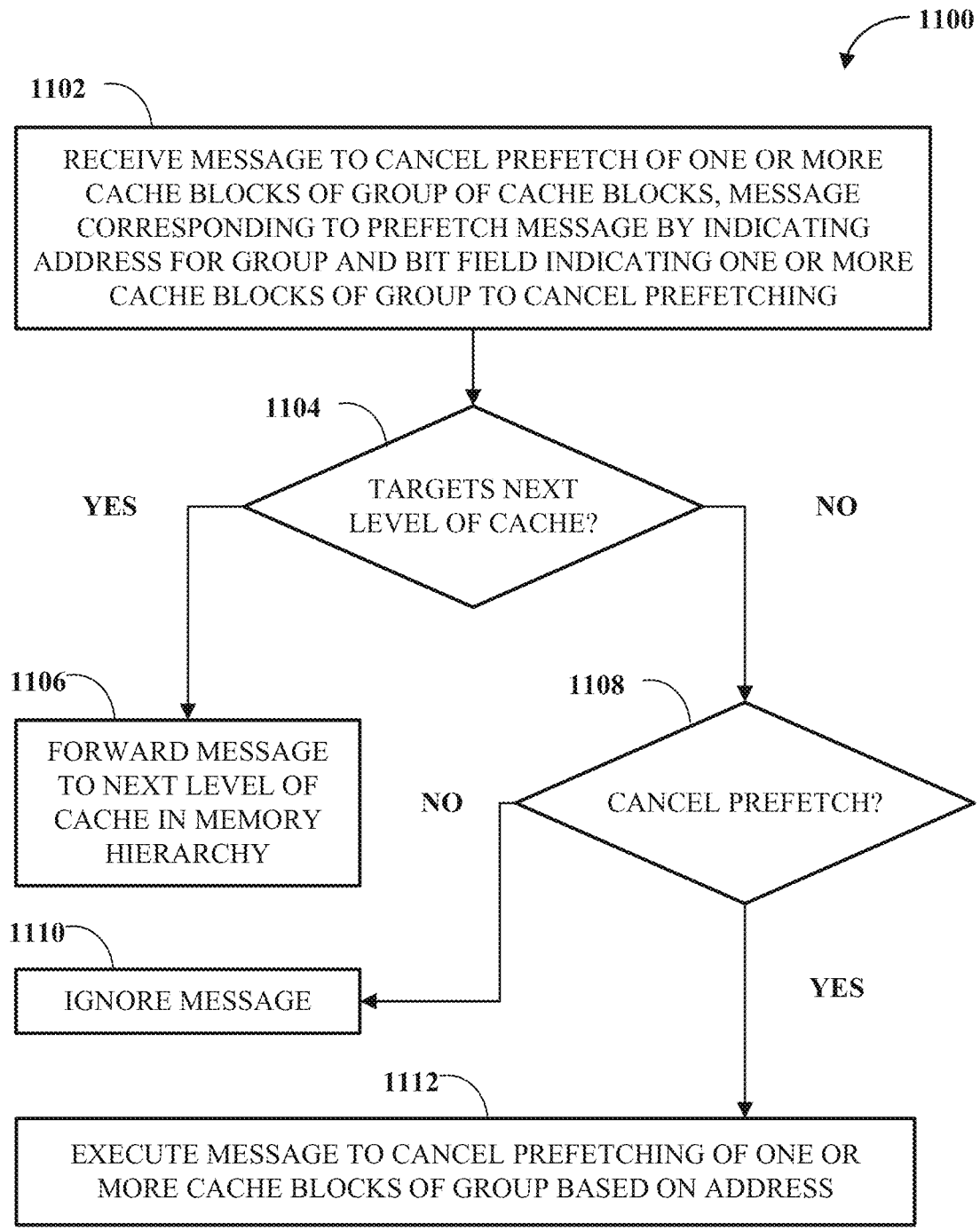
FIG. 11 is a flow chart of an example of a technique for receiving a message to cancel a prefetch of one or more cache blocks in a group.

FIG. 11 is a flow chart of an example of a technique 1100 for receiving a message to cancel a prefetch of one or more cache blocks in a group. The technique 1100 can be performed, for example, using the systems, hardware, and software described with respect to FIGS. 1-9. The steps, or operations, of the technique 1100 or another technique, method, process, or algorithm described in connection with the implementations disclosed herein can be implemented directly in hardware, firmware, software executed by hardware, circuitry, or a combination thereof. For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, an agent may receive a message to cancel one or more cache blocks of a group of cache blocks. The message may correspond to a prefetch message by indicating an address for the group (e.g., the address 702, or the "address" field in the table 900) and a bit field indicating the one or more cache blocks of the group of cache blocks to cancel prefetching (e.g., the "mask" field in the table 900). For example, the message may be configured by prefetch circuitry, such as the prefetch circuitry 520 associated with the processor core 502. The message may be configured to target a level of cache in a memory hierarchy, such as the L2 cache 506 or the L3 cache 508.

At 1104, the agent receiving the message may determine whether the cancel (e.g., the message) targets a cache associated with that agent (e.g., the agent is aware of its level of cache in the memory hierarchy) or targets a next level of cache in the memory hierarchy. The agent may make the determination based on a hint field associated with the message that indicates a level of cache in the memory hierarchy that the cancel is targeting (e.g., the "temporal" field in the table 900). If the cancel targets a next level of cache in the memory hierarchy ("Yes"), at 1106 the agent may forward the message to another agent associated with the next level of cache in the memory hierarchy. For example, the agent could be the agent 514 associated with the L2 cache 506, and based on the cancel targeting the L3 cache 508, the agent 514 could forward the message to the agent 516 associated with the L3 cache 508. However, at 1104, if the cancel does not target a next level of cache in the memory hierarchy ("No"), and instead targets a cache associated with the agent receiving the message, at 1108 the agent may determine whether to apply the message to cancel prefetching (e.g., the hint) as indicated by the message (e.g., to execute the message, which may be responsive to a mis-speculation or mis-prediction associated with one or more of the cache blocks). For example, the agent may make the determination to apply the message to cancel prefetching based whether a fill request has already issued for the one or more cache blocks (e.g., the prefetch message being partially executed, or after execution of the prefetch message begins by expanding the prefetch message into individual cache block commands and before completion of execution of the prefetch message by issuing fill requests to retrieve data). At 1108, if the agent determines not to apply the message to cancel prefetching ("No"), at 1110 the agent may ignore the message. This may enable the agent, for example, to complete the prefetching as planned. However, at 1108, if the agent determines to apply the message to cancel prefetching ("Yes"), at 1112 the agent may execute the message to cancel the prefetch of the one or more cache blocks of the group based on the address (e.g., execute the message responsive to the determination of the mis-speculation or mis-prediction). The cancel message may be executed after execution of the prefetch message begins and before completion of execution of the prefetch message. In some implementations, executing the cancel message may result in avoiding either the expansion or execution of one or more cache block commands associated with the prefetch message. This may enable a possible performance improvement by conserving power (e.g., avoiding certain prefetches to memory) and bandwidth (e.g., limiting the number of prefetches, so that more useful prefetches can be prioritized) in the system.

Some implementations may include an apparatus comprising: prefetch circuitry configured to transmit a message to cancel a prefetch of one or more cache blocks of a group of cache blocks, the message corresponding to a prefetch message by indicating an address for the group and a bit field for the one or more cache blocks of the group to cancel. In some implementations, the message is configured to target a higher level cache, via a lower level cache, to cancel prefetching of one or more cache blocks at the higher level cache. In some implementations, the message is configured to target a higher level cache to cancel the prefetch of the one or more cache blocks, the message is configured to transmit to a lower level cache via a first command bus, and the lower level cache is configured to forward the message to the higher level cache via a second command bus. In some implementations, the message includes a hint field that indicates a level of cache that the cancel is targeting. In some implementations, the message is transmitted to an agent associated with a cache, and the message causes the agent to abort prefetching the one or more cache blocks based on the bit field. In some implementations, the prefetch circuitry transmits the message to cancel the prefetch based on determining a mis-speculation associated with the one or more cache blocks. In some implementations, the message is transmitted to an agent associated with a cache, and the message causes the agent to determine to cancel prefetching based on whether a fill operation associated with the one or more cache blocks has been issued. In some implementations, the apparatus may further include an agent associated with a cache, wherein the agent ignores the message when the agent receives the message after transmitting a request to prefetch the one or more cache blocks. In some implementations, programming a first bit in a bit mask configures the bit field to cause an agent to cancel the prefetch of a first cache block of the group of cache blocks. In some implementations, the address is aligned to a 1 kilobyte region of addressable memory with a first cache block of the group corresponding to a first cache block in the 1 kilobyte region. In some implementations, a cache block of the group includes at least 64 Bytes, and the group includes at least 16 cache blocks.

Some implementations may include a method comprising: transmitting a message to cancel a prefetch of one or more cache blocks of a group of cache blocks, the message corresponding to a prefetch message by indicating an address for the group and a bit field for the one or more cache blocks of the group to cancel. In some implementations, the method may include configuring the message to target a higher level cache to cancel prefetching of one or more cache blocks at the higher level cache, wherein the message is transmitted to the higher level cache via a lower level cache. In some implementations, the method may include configuring the message to target a higher level cache to cancel the prefetch of the one or more cache blocks, wherein the message is transmitted to a lower level cache via a first command bus, and the lower level cache forwards the message to the higher level cache via a second command bus. In some implementations, the method may include programming a hint field associated with the message, wherein the hint field indicates a level of cache that the cancel is targeting. In some implementations, the method may include transmitting the message to an agent associated with a cache, wherein the message causes the agent to cancel prefetching the one or more cache blocks based on the bit field. In some implementations, the method may include determining a mis-speculation associated with the one or more cache blocks, wherein the message is transmitted to cancel the prefetch based on the mis-speculation. In some implementations, the method may include transmitting the message to an agent associated with a cache, wherein the message causes the agent to determine to cancel prefetching based on whether a fill operation associated with the one or more cache blocks has been issued. In some implementations, the method may include ignoring, by an agent associated with a cache, the message when the agent receives the message after transmitting a request to prefetch the one or more cache blocks. In some implementations, the method may include programming a first bit in a bit mask to configure the bit field to cause an agent to cancel the prefetch of a first cache block of the group of cache blocks. In some implementations, the address is aligned to a 1 kilobyte region of addressable memory with a first cache block of the group corresponding to a first cache block in the 1 kilobyte region. In some implementations, cache block of the group includes at least 64 Bytes, and the group includes at least 16 cache blocks.

Some implementations may include a non-transitory computer readable medium comprising a circuit representation that, when processed by a computer, is used to program or manufacture an integrated circuit comprising: prefetch circuitry configured to transmit a message to cancel a prefetch of one or more cache blocks of a group of cache blocks, the message corresponding to a prefetch message by indicating an address for the group and a bit field for the one or more cache blocks of the group to cancel. In some implementations, the message is configured to target a higher level cache, via a lower level cache, to cancel prefetching of one or more cache blocks at the higher level cache. In some implementations, the message is configured to target a higher level cache to cancel the prefetch of the one or more cache blocks, the message is configured to transmit to a lower level cache via a first command bus, and the lower level cache is configured to forward the message to the higher level cache via a second command bus. In some implementations, the message includes a hint field that indicates a level of cache that the cancel is targeting. In some implementations, the message is transmitted to an agent associated with a cache, and the message causes the agent to cancel prefetching the one or more cache blocks based on the bit field. In some implementations, the prefetch circuitry transmits the message to cancel the prefetch based on determining a mis-speculation associated with the one or more cache blocks. In some implementations, the message is transmitted to an agent associated with a cache, and the message causes the agent to determine to cancel prefetching based on whether a fill operation associated with the one or more cache blocks has been issued. In some implementations, the message is transmitted to an agent associated with a cache, and the agent is configured to ignore the message when the agent receives the message after transmitting a request to prefetch the one or more cache blocks. In some implementations, programming a first bit in a bit mask configures the bit field to cause an agent to cancel the prefetch of a first cache block of the group of cache blocks. In some implementations, the address is aligned to a 1 kilobyte region of addressable memory with a first cache block of the group corresponding to a first cache block in the 1 kilobyte region. In some implementations, a cache block of the group includes at least 64 Bytes, and the group includes at least 16 cache blocks.

Some implementations may include a method comprising: canceling a prefetch message that targets a plurality of cache blocks and that is partially executed by executing a cancel message corresponding to the prefetch message. In some implementations, the cancel message includes fields that match fields included in the prefetch message. In some implementations, the cancel message is executed responsive to a determination of a mis-speculation associated with at least one of the plurality cache blocks. In some implementations, the cancel message is executed after execution of the prefetch message begins and before completion of execution of the prefetch message. In some implementations, the prefetch message is a compressed prefetch message, executing the prefetch message includes expanding the prefetch message into individual cache block commands, and executing the cancel message results in avoiding either the expansion or execution of one or more cache block commands.

Some implementations may include an apparatus comprising: prefetch circuitry configured to cancel a prefetch message that targets a plurality of cache blocks and that is partially executed by executing a cancel message corresponding to the prefetch message. In some implementations, the cancel message includes fields that match fields included in the prefetch message. In some implementations, the cancel message is executed responsive to a determination of a mis-speculation associated with at least one of the plurality cache blocks. In some implementations, the cancel message is executed after execution of the prefetch message begins and before completion of execution of the prefetch message. In some implementations, the prefetch message is a compressed prefetch message, executing the prefetch message includes expanding the prefetch message into individual cache block commands, and executing the cancel message results in avoiding either the expansion or execution of one or more cache block commands.

Some implementations may include a non-transitory computer readable medium comprising a circuit representation that, when processed by a computer, is used to program or manufacture an integrated circuit comprising: prefetch circuitry configured to cancel a prefetch message that targets a plurality of cache blocks and that is partially executed by executing a cancel message corresponding to the prefetch message. In some implementations, the cancel message includes fields that match fields included in the prefetch message. In some implementations, the cancel message is executed responsive to a determination of a mis-speculation associated with at least one of the plurality cache blocks. In some implementations, the cancel message is executed after execution of the prefetch message begins and before completion of execution of the prefetch message. In some implementations, the prefetch message is a compressed prefetch message, executing the prefetch message includes expanding the prefetch message into individual cache block commands, and executing the cancel message results in avoiding either the expansion or execution of one or more cache block commands.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function. While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:
1. An apparatus comprising:
   prefetch circuitry configured to:
      transmit a prefetch message to generate a prefetch of one or more cache blocks of a group of cache blocks; and transmit a cancel message that causes canceling the prefetch of the one or more cache blocks of the group of cache blocks, the cancel message including an address that indicates the group of cache blocks and a bit field that indicates the cache block of the one or more cache blocks of the group; and a processor core to use the prefetch circuitry to prefetch data.

2. The apparatus of claim 1, wherein the message is configured to target a higher level cache, via a lower level cache, to cancel prefetching of one or more cache blocks at the higher level cache.

3. The apparatus of claim 1, wherein the message is configured to target a higher level cache to cancel the prefetch of the one or more cache blocks, the message is configured to transmit to a lower level cache via a first command bus, and the lower level cache is configured to forward the message to the higher level cache via a second command bus.

4. The apparatus of claim 1, wherein the message includes a hint field that indicates a level of cache that the cancel is targeting.

5. The apparatus of claim 1, wherein the message is transmitted to an agent associated with a cache, and the message causes the agent to abort prefetching the one or more cache blocks based on the bit field.

6. The apparatus of claim 1, wherein the prefetch circuitry transmits the message to cancel the prefetch based on determining a mis-speculation associated with the one or more cache blocks.

7. The apparatus of claim 1, wherein the message is transmitted to an agent associated with a cache, and the message causes the agent to determine to cancel prefetching based on whether a fill operation associated with the one or more cache blocks has been issued.

8. A method comprising:
transmitting a prefetch message to generate a prefetch of one or more cache blocks of a group of cache blocks; and
transmitting a cancel message that causes canceling the prefetch of the one or more cache blocks of the group of cache blocks, the cancel message including an address that indicates the group of cache blocks and a bit field that indicates the cache block of the one or more cache blocks of the group-to cancel.

9. The method of claim 8, further comprising:
configuring the message to target a higher level cache to cancel prefetching of one or more cache blocks at the higher level cache, wherein the message is transmitted to the higher level cache via a lower level cache.

10. The method of claim 8, further comprising:
configuring the message to target a higher level cache to cancel the prefetch of the one or more cache blocks, wherein the message is transmitted to a lower level cache via a first command bus, and the lower level cache forwards the message to the higher level cache via a second command bus.

11. A non-transitory computer readable medium comprising a circuit representation that, when processed by a computer, is used to program or manufacture an integrated circuit comprising prefetch circuitry configured to:
transmit a prefetch message to generate a prefetch of one or more cache blocks of a group of cache blocks; and
transmit a cancel message that causes canceling the prefetch of the one or more cache blocks of the group of cache blocks, the cancel message including an address that indicates the group of cache blocks and a bit field that indicates the cache block of the one or more cache blocks of the group.

12. The non-transitory computer readable medium of claim 11, wherein the message is configured to target a higher level cache, via a lower level cache, to cancel prefetching of one or more cache blocks at the higher level cache.

13. The non-transitory computer readable medium of claim 11, wherein the message is configured to target a higher level cache to cancel the prefetch of the one or more cache blocks, the message is configured to transmit to a lower level cache via a first command bus, and the lower level cache is configured to forward the message to the higher level cache via a second command bus.

14. The non-transitory computer readable medium of claim 11, wherein the message includes a hint field that indicates a level of cache that the cancel is targeting.

15. The non-transitory computer readable medium of claim 11, wherein the message is transmitted to an agent associated with a cache, and the message causes the agent to cancel prefetching the one or more cache blocks based on the bit field.

16. The non-transitory computer readable medium of claim 11, wherein the prefetch circuitry transmits the message to cancel the prefetch based on determining a mis-speculation associated with the one or more cache blocks.

17. The non-transitory computer readable medium of claim 11, wherein the message is transmitted to an agent associated with a cache, and the message causes the agent to determine to cancel prefetching based on whether a fill operation associated with the one or more cache blocks has been issued.

18. The non-transitory computer readable medium of claim 11, wherein the message is transmitted to an agent associated with a cache, and the agent is configured to ignore the message when the agent receives the message after transmitting a request to prefetch the one or more cache blocks.

19. The non-transitory computer readable medium of claim 11, wherein programming a first bit in a bit mask configures the bit field to cause an agent to cancel the prefetch of a first cache block of the group of cache blocks.

20. The non-transitory computer readable medium of claim 11, wherein the address is aligned to a 1 kilobyte region of addressable memory with a first cache block of the group corresponding to a first cache block in the 1 kilobyte region.

* * * * *